United States Patent [19]

Wigram

[11] Patent Number: 4,555,210
[45] Date of Patent: Nov. 26, 1985

[54] SPREADER DEVICE IN A STORAGE CONTAINER FOR UNIFORM FILLING OF THE CONTAINER WITH GRANULAR STORAGE GOODS

[76] Inventor: Stig Wigram, Nationsgatan 16, S-223 63 Lund, Sweden

[21] Appl. No.: 552,131
[22] PCT Filed: Feb. 22, 1983
[86] PCT No.: PCT/SE83/00060
§ 371 Date: Oct. 19, 1983
§ 102(e) Date: Oct. 19, 1983
[87] PCT Pub. No.: WO83/02873
PCT Pub. Date: Sep. 1, 1983

[30] Foreign Application Priority Data
Feb. 23, 1982 [SE] Sweden ............................ 8201113

[51] Int. Cl.⁴ ............................................. A01F 25/18
[52] U.S. Cl. ....................................... 414/301; 239/687
[58] Field of Search ............... 414/293, 299, 300, 301; 239/687

[56] References Cited

U.S. PATENT DOCUMENTS 3,488,007 1/1970 Neuenschwander ............... 239/687
3,490,619 1/1970 De Wittie ....................... 239/687 X Primary Examiner—Robert G. Sheridan
Attorney, Agent, or Firm—Barnes, Kisselle, Raisch, Choate, Whittemore & Hulbert

[57] ABSTRACT

A spreader device in a storage container, such as a silo compartment, for uniform filling of the container with granular storage goods. A generally conical body (1) is suspended for rotation about its longitudinal axis in the container below the outlet of the fill spout of the container, and the upper narrow end of the body faces the mouth of the fill spout (2) and forms the bottom of a number of upwardly open channels which are distributed over the outer side of the body in the peripheral direction thereof and open at the lower end of the body, each of the channels being associated with a transverse blade (7) fixed to the conical body radially outwardly of the lower end thereof. The blades (7) take different degrees of inclination to the longitudinal axis of the body.

5 Claims, 3 Drawing Figures

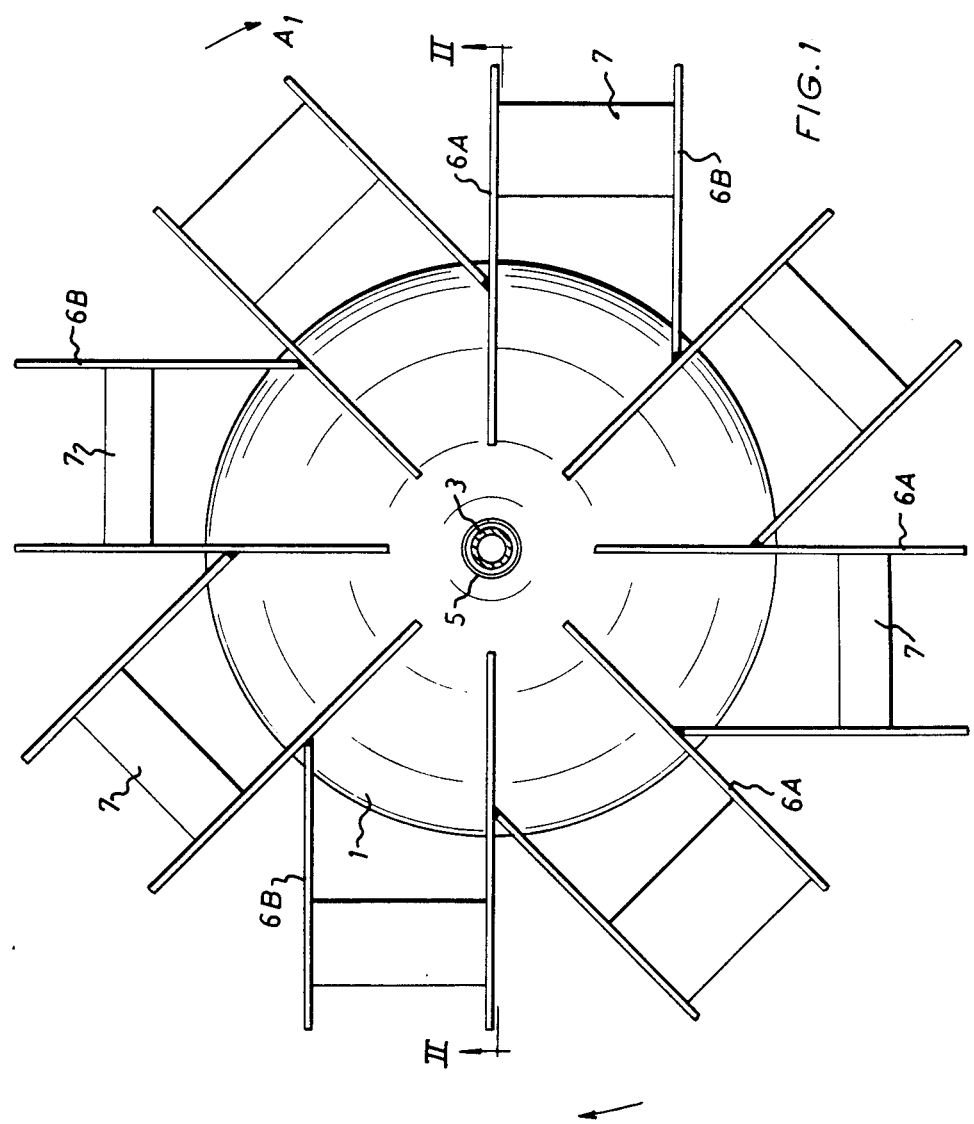

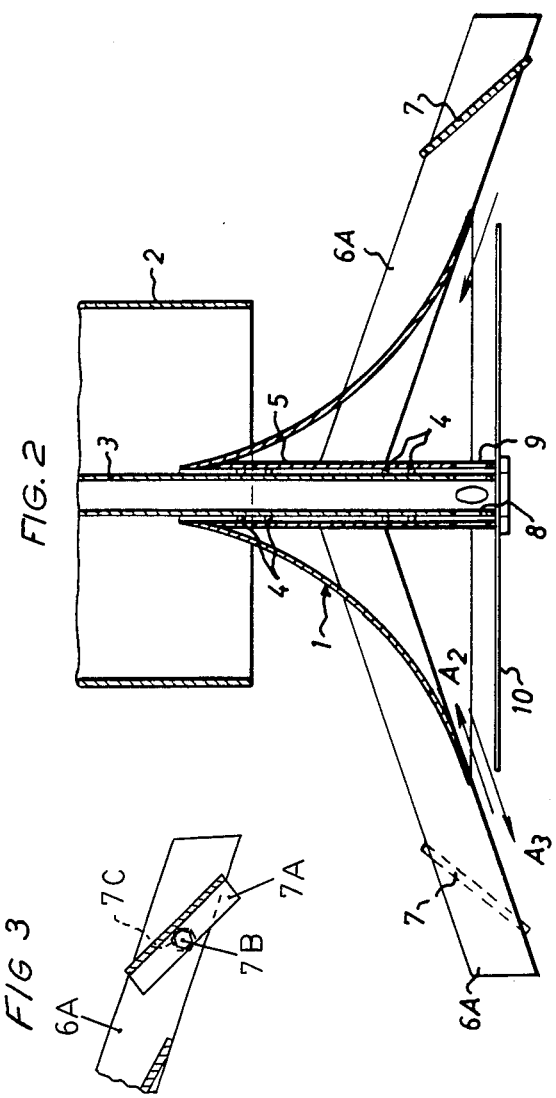

SPREADER DEVICE IN A STORAGE CONTAINER FOR UNIFORM FILLING OF THE CONTAINER WITH GRANULAR STORAGE GOODS

This invention relates to a spreader device in a silo compartment type storage container for uniform filling of the container with granular storage goods.

Conventionally, a silo compartment is filled with the aid of a fill spout, so-called chute, opening into the upper end of the silo compartment. The chute introduces the storage goods, such as grain or the like, into the silo compartment such that the storage goods impinge in the form of a jet against the surface layer of the storage goods already present in the silo compartment, whereby there arises a disadvantageous separation of the storage goods into fractions of different size particles, the fine particles remaining near the point of impact, while the coarse particles move in a secondary movement radially outwardly from said impact point, and whereby the heterogeneous compaction in the silo compartment is obtained, implying that the highest value of the compaction prevails below the impact point.

The object of the invention is to overcome the disadvantages outlined above to provide such a container filling technique as results in a more uniform particle size distribution over optional container cross-sectional areas and a more uniform grain compaction degree vertically of the container than the above-described prior art filling technique.

This object is realized according to the present invention by means of a spreader device which is characterised by a generally conical body which is suspended for rotation about its longitudinal axis in the container directly below the outlet of the material supply conduit of the container and the upper narrow end of which faces the mouth of the fill spout and forms the bottom of a number of upwardly open channels which are distributed over the outer side of said body in the peripheral direction thereof and open at the lower end of said body, each of said channels being associated with a transverse blade fixed to the conical body radially outwardly of the lower end thereof, said blades taking different degrees of inclination to the longitudinal axis of the conical body.

The granular stream exiting from the fill spout is thus divided by the spreader device according to the invention, more specifically by the upwardly open channels thereof, into several part streams which slide downwardly in said channels and are thrown against the transverse blades at the same time as said part streams are actuated by centrifugal force generated either by the device being rotated with the aid of a motor or by the channels being provided with some element deviating from the direction of the generatrix of the body. The variant including the motor is preferably utilised if the silo compartment has so large a cross-sectional area that the available kinetic energy of the stream of kernels of grain does not suffice to throw the kernels all the way to the compartment wall. Every divided stream of kernels bounces against the associated transverse blade and due to the rotation of the body it swoops down in a predetermined annular area of the surface of the material already present in the compartment, the different inclinations of the blades providing concentric annular areas on said surface.

By splitting up the filling stream in this manner into a shower of kernels of almost constant intensity over the cross-sectional area of the container, one gains increased homogeneity, uniformly distributed pressure intensity against the container walls, increased storage capacity of the container due to the increased compaction degree, and moreover the need of subsequent compaction is eliminated because the maximum storage capacity of the container can be attained in a continuous filling operation. Further, an advantageous aeration of the material is obtained during the filling of the container.

The device according to the invention may preferably include a connection with a compressed air/vacuum source. Compressed air can be employed for instance to assist in moving the most light-weight kernels in each part stream up to the transverse blades, and vacuum can be employed for instance to suck away hulls, in the case of grain being the storage goods, which are released at the impaction of the kernels against the transverse blades.

The invention will be described more in detail below with reference to the accompanying drawings in which:

FIG. 1 shows a top plan view of the device according to the invention, and

FIG. 2 is a longitudinal section on line II—II in FIG. 1.

FIG. 3 is a detailed showing of transverse blade mounting.

An axisymmetrical conical body 1 having a preferably outwardly concavely curved generatrix is suspended with its narrow end directed upwardly at the upper end of a silo compartment (not shown) directly below the outlet from the fill spout 2 of the silo compartment. The suspension is realised by means of an inner tube 3 which is fixed in the fill spout 2 or at the ceiling of the silo compartment and is concentrical with the fill spout, and an outer tube 5 which is freely rotatably mounted on the outer side of the inner tube 3 by means of bearings 4. Walls 6A, 6B are mounted on the conical body 1. The walls 6A are spaced equal distances apart and placed on their longitudinal edges, extending radially through slots in the body 1, which extend in the direction of the generatrix of the body 1, and the walls 6A are attached with their inner ends to the outer tube 5. The walls 6B are also spaced equal distances apart and each extend in parallel with its respective wall 6A and is attached with its inner end to said wall 6A in a region inside the base line of the body. Any two walls 6A and the wall 6B between them form together with the circumferential surface of the body 1 a channel on said body, which is prolonged to a point outside the body where it has a transverse blade 7 which has its ends fixed in the walls 6A, 6B, preferably for pivotment towards and away from the longitudinal axis of the body and for latching in any desired position of pivotment. For example, as shown in FIG. 3, each blade 7 may be provided with a flange 7A at each end and a bolt 7B extends through aligned openings in the walls 6A, 6B and flanges 7A with a unit 7C is threaded on each bolt 7B and tightened on each bolt 7B to hold the blade 7 in adjusted position. Those skilled in the art will not experience any difficulty in providing an adjusting and latching assembly suitable for this purpose, such as some kind of ratchet and pawl mechanism. Thus, the blades 7 occupy or are so adjusted as to take mutually different positions of inclination to the longitudinal axis of the body. The distances of the blades and their inclination to the longitudinal axis of the body are so selected that the stream of material supplied through the fill spout and divided by the channels impinges on the blades and is thrown through the opening defined by the base of the body, the walls 6A, 6B and the blades 7 down into the silo compartment. By reason of the lateral boundary wall 6B of the channels which deviates from the direction of the generatrix the kernels will have imparted to them a rotational movement in the direction of the arrow A1 so that they swoop down within predetermined concentrical annular areas of the compartment bottom/surface of the storage goods already present.

The inner tube 3 can be connected to a source of vacuum or compressed gas which can act upon the kernels leaving the body 1 via openings 8, 9 in the inner tube 3 and the outer tube 5, respectively, and via a slot between a plate 10 disposed horizontally beneath the body 1 and the base line thereof for sucking in tail, such as hulls, as shown by the arrow A2, or for blowing light-weight constituents of the material against the blades 7, as shown by the arrow A3.

When the fill spout, as is frequently the case in conventional silo constructions, is disposed in a position of inclination to the longitudinal axis of the silo compartment with which the longitudinal axis of the spreader should be coincident, said fill spout should be extended by means of an angled conduit the lower part of which is vertical and situated directly above the spreader, i.e. the longitudinal axis of said lower part coincides with that of the spreader. The upper inclined part of the angled conduit which is situated between the vertical lower part and the existant inclined fill spout in the prolongation thereof, is preferably formed as an upwardly open channel over the brims of which the material can flow during the concluding silo filling phase.

The transition from the upper inclined part of the angled conduit to the lower vertical part thereof should not really be a simple elbow since that might entail a separation of different grain fractions in the stream of material and also give rise to a heterogeneous stream because the material supplied would bounce between wall portions of the lower vertical part of the conduit.

To reduce this risk the channel is provided with a partition which extends longitudinally of the channel in the center thereof, and two curved deflection baffles are secured to the lower end of said partition to guide the stream of material supplied in two diametrically opposite directions towards inner wall portions of the lower vertical part of the conduit which preferably is in the form of a hopper disposed on the mounting shaft of the spreader coaxially with said shaft.

I claim:

1. A spreader device in a storage container, such as a silo compartment, for uniform filling of the container with granular storage goods, including a generally conical body (1) which is suspended for rotation about its longitudinal, vertical axis in the container directly below the mouth of the fill spout (2) of the container with the upper narrow end of said body facing said fill spout mouth, said body forming the bottom of a number of similar upwardly open channels defined by spaced boundary walls that extend beyond the periphery of said body, said channels being distributed regularly over the outer side of said body in the peripheral direction thereof and open at the lower end of said body, each of said channels being equipped with a transverse blade (7) fixed to the lateral boundary walls (6A, 6B) thereof radially outwardly of the lower end of said body, said blades (7) being positioned at different degrees of inclination to the longitudinal axis of said body and serving as baffles for deviating the stream of material at the end of each channel downwardly.

2. A device as claimed in claim 1, characterised in that the inclination of each transverse blade (7) is individually adjustable.

3. A device as claimed in claim 1, characterised in that the generatrix of the body (1) is concavely curved outwardly.

4. A device as claimed in any one of claims 1-3, characterised in that the body (1) is freely rotatably mounted on a shaft (3), one lateral boundary wall (6A) of the channels extending in the direction of the generatrix of the body, while the other lateral boundary wall (6B) of the channels has a member deviating from the direction of the generatrix of said body, the extensions of said wall and said member beyond the body (1) fixedly supporting the blade (7) between them.

5. A device as claimed in claim 4, characterised in that the shaft (3) is hollow and provided in its circumferential surface with openings (8) situated below the body, said openings being connectible through the shaft (3) to a source of vacuum or compressed air.

* * * * *